United States Patent
Challener et al.

(10) Patent No.: US 6,795,630 B2
(45) Date of Patent: Sep. 21, 2004

(54) APPARATUS AND METHOD FOR PRODUCING A SMALL SPOT OF OPTICAL ENERGY

(75) Inventors: William Albert Challener, Sewickley, PA (US); Christophe Daniel Mihalcea, Pittsburgh, PA (US); Tim Rausch, Gibsonia, PA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/391,729

(22) Filed: Mar. 19, 2003

(65) Prior Publication Data

US 2004/0001394 A1 Jan. 1, 2004

Related U.S. Application Data

(60) Provisional application No. 60/392,167, filed on Jun. 28, 2002, and provisional application No. 60/414,968, filed on Sep. 30, 2002.

(51) Int. Cl.$^7$ ............................. G02B 6/10; G11B 7/135
(52) U.S. Cl. ..................... 385/129; 385/146; 369/13.32; 369/112.27
(58) Field of Search .................................. 385/129–133, 385/146; 369/13.32, 13.33, 112.27

(56) References Cited

U.S. PATENT DOCUMENTS

| | | |
|---|---|---|
| 4,947,034 A | 8/1990 | Wickramasinghe et al. |
| 4,994,818 A | 2/1991 | Keilmann |
| 5,004,307 A | 4/1991 | Kino et al. |
| 5,121,256 A | 6/1992 | Corle et al. |
| 5,125,750 A | 6/1992 | Corle et al. |
| 5,286,971 A | 2/1994 | Betzig et al. |
| 5,559,330 A * | 9/1996 | Murashita .................... 250/306 |
| 5,602,820 A | 2/1997 | Wickramasinghe et al. |
| 5,664,036 A | 9/1997 | Islam |
| 5,883,872 A | 3/1999 | Kino |
| 5,930,434 A | 7/1999 | Mowry et al. |
| 5,982,716 A | 11/1999 | Kino et al. |

(List continued on next page.)

FOREIGN PATENT DOCUMENTS

| | | |
|---|---|---|
| EP | 1128372 A2 | 8/2001 |
| JP | 2001-256664 | 9/2001 |

OTHER PUBLICATIONS

S. M. Mansfield et al., "Solid Immersion Microscope," *Appl. Phys. Lett*, vol. 57, No. 24, Dec. 10, 1990, pp. 2615–2616.

B. D. Terris et al., "Near–Field Optical Data Storage Using A Solid Immersion Lens," *Appl. Phys. Lett*, vol. 65, No. 4, Jul. 25, 1994, pp. 388–390.

Y. Martin et al., "Optical Data Storage Read Out at 256 Gbits/in$^2$," *Appl. Phys. Lett.*, vol. 71, No. 1, Jul. 7, 1997, pp. 1–3.

(List continued on next page.)

*Primary Examiner*—John D. Lee
*Assistant Examiner*—Mike Stahl
(74) *Attorney, Agent, or Firm*—Robert P. Lenart, Esq.; Pietragallo, Bosick & Gordon

(57) ABSTRACT

An apparatus for producing a small spot of optical energy comprises a planar waveguide shaped to direct a linearly polarized electromagnetic wave to a focal point within the waveguide, and a metallic pin positioned at the focal point whereby the linearly polarized electromagnetic wave creates surface plasmons on a surface of the pin. The apparatus can further comprise means for phase shifting a portion of the linearly polarized electromagnetic wave. Recording heads comprising a magnetic write pole, a planar waveguide positioned adjacent to the magnetic write pole, the planar waveguide being shaped to direct a linearly polarized electromagnetic wave to a focal point within the waveguide, and a metallic pin positioned at the focal point whereby the linearly polarized electromagnetic wave creates surface plasmons on a surface of the pin, and disc drives that use such recording heads are also disclosed.

33 Claims, 8 Drawing Sheets

U.S. PATENT DOCUMENTS

| | | | |
|---|---|---|---|
| 6,043,940 | A | 3/2000 | Kamiyama et al. |
| 6,055,220 | A | 4/2000 | Mamin et al. |
| 6,091,694 | A | 7/2000 | Späth |
| 6,275,453 | B1 | 8/2001 | Ueyanagi et al. |
| 6,298,026 | B1 | 10/2001 | Suzuki et al. |
| 6,320,708 | B1 | 11/2001 | Ueyanagi et al. |
| 6,396,776 | B1 | 5/2002 | Ueyanagi |
| 6,408,123 | B1 | 6/2002 | Kuroda et al. |
| 6,473,385 | B1 | 10/2002 | Saito |
| 2001/0004348 | A1 | 6/2001 | Ueyanagi |
| 2001/0009541 | A1 | 7/2001 | Ueyanagi |
| 2002/0056816 | A1 | 5/2002 | Stark |
| 2002/0080709 | A1 | 6/2002 | Park et al. |
| 2002/0114567 | A1 | 8/2002 | Novotny et al. |
| 2003/0128633 | A1 | 7/2003 | Batra et al. |
| 2003/0128634 | A1 | 7/2003 | Challener |
| 2003/0137772 | A1 | 7/2003 | Challener |
| 2003/0184903 | A1 | 10/2003 | Challener |
| 2004/0001420 | A1 | 1/2004 | Challener |
| 2004/0008591 | A1 | 1/2004 | Johns et al. |

OTHER PUBLICATIONS

H. F. Ghaemi et al., "Surface Plasmons Enhance Optical Transmission Through Subwavelength Holes", *Physical Review B*, vol. 58, No. 11, Sep. 15, 1998, pp. 6779–6782.

K. Ueyanagi et al., "Proposal of a Near–Field Optical Head Using a New Solid Immersion Mirror," *Jpn. J. Appl. Phys.*, vol. 39, Part 1, No. 2B, Feb. 2000, pp. 888–891.

Y.–J. Kim et al., "Fabrication of Micro–Pyramidal Probe Array with Aperture for Near–Field Optical Memory Applications," *Jpn. J. Appl. Phys.*, vol. 39. Part 1, No. 3B, Mar. 2000, pp. 1538–1541.

S. Quabis et al., "Focusing Light to a Tighter Spot," *Optics Communications*, vol. 179, May 25, 2000, pp. 1–7.

R. Coehoorn et al., "Hybrid Recording," *Magnetic Storage Systems Beyond 2000*, Proceedings of the NATO–ASI on Rhodes (Greece), Jun. 2000, pp. 1–17.

T. D. Milster et al., "Super–Resolution by Combination of a Solid Immersion Lens and an Aperture," *Jpn. J. Appl. Phys.*, vol. 40, Part 1, No. 3B, Mar. 2001, pp. 1778–1782.

Y.–J. Kim et al., "Parallel Recording Array Head of Nano–Aperture Flat–Tip Probes for High–Density Near–Field Optical Data Storage," *Jpn. J. Appl. Phys.*, vol. 40, Part 1, No. 3B, Mar. 2001, pp. 1783–1789.

H. Hatano et al., "Plano–Convex Solid Immersion Mirror with a Small Aperture for Near–Field Optical Data Storage," *Optical Review*, vol. 9, No. 2, Feb. 4, 2002, pp. 66–69.

T. E. Schlesinger et al., "An Integrated Read/Write Head for Hybrid Recording," *Jpn. J. Appl. Phys.*, vol. 41, Part 1, No. 3B, Mar. 2002, pp. 1821–1824.

K. Goto et al., "Microoptical Two–Dimensional Devices for the Optical Memory Head of an Ultrahigh Data Transfer Rate and Density System Using a Vertical Cavity Surface Emitting Laser (VCSEL) Array," *Jpn. J. Appl. Phys.*, vol. 41, Part 1, No. 7B, Jul. 2002, pp. 4835–4840.

B. B. Goldberg et al., "Immersion Lens Microscopy of Photonic Nanostructures and Quantum Dots," *IEEE Journal of Selected Topics in Quantum Electronics*, vol. 8, No. 5, Sep./Oct. 2002, pp. 1051–1059.

C. W. Lee et al., "Feasibility Study On Near Field Optical Memory Using A Catadioptric Optical System," Samsung Electronics Co., Ltd., Korea, pp. WA4–1/137–WA4–3/139.

* cited by examiner

APPARATUS AND METHOD FOR PRODUCING A SMALL SPOT OF OPTICAL ENERGY

CROSS REFERENCE TO RELATED APPLICATION

This application claims the benefit of U.S. Provisional Patent Applications Ser. No. 60/392,167, filed Jun. 28, 2002, and 60/414,968, filed Sep. 30, 2002.

STATEMENT REGARDING FEDERALLY SPONSORED RESEARCH OR DEVELOPMENT

This invention was made with the United States Government support under Agreement No. 70NANB1H3056 awarded by the National Institute of Standards and Technology (NIST). The United States Government has certain rights in the invention.

FIELD OF THE INVENTION

This invention relates to optical waveguides, and more particularly to optical waveguides that can be used in heat assisted magnetic recording.

BACKGROUND OF THE INVENTION

Magnetic recording heads have utility in magnetic disc drive storage systems. Most magnetic recording heads used in such systems today are "longitudinal" magnetic recording heads. Longitudinal magnetic recording in its conventional form has been projected to suffer from superparamagnetic instabilities at high bit densities.

Superparamagnetic instabilities become an issue as the grain volume is reduced in order to control media noise for high areal density recording. The superparamagnetic effect is most evident when the grain volume V is sufficiently small that the inequality $K_u V/k_B T > 70$ can no longer be maintained. $K_u$ is the material's magnetic crystalline anisotropy energy density, $k_B$ is Boltzmann's constant, and T is absolute temperature. When this inequality is not satisfied, thermal energy demagnetizes the stored bits. Therefore, as the grain size is decreased in order to increase the areal density, a threshold is reached for a given material $K_u$ and temperature T such that stable data storage is no longer feasible.

The thermal stability can be improved by employing a recording medium formed of a material with a very high $K_u$. However, with the available materials the recording heads are not able to provide a sufficient or high enough magnetic writing field to write on such a medium. Accordingly, it has been proposed to overcome the recording head field limitations by employing thermal energy to heat a local area on the recording medium before or at about the time of applying the magnetic write field to the medium. Heat assisted magnetic recording generally refers to the concept of locally heating a recording medium to reduce the coercivity of the recording medium so that the applied magnetic writing field can more easily direct the magnetization of the recording medium during the temporary magnetic softening of the recording medium caused by the heat source. Heat assisted magnetic recording allows for the use of small grain media, which is desirable for recording at increased areal densities, with a larger magnetic anisotropy at room temperature to assure sufficient thermal stability. Heat assisted magnetic recording can be applied to any type of magnetic storage media, including tilted media, longitudinal media, perpendicular media and patterned media. By heating the medium, the $K_u$ or the coercivity is reduced such that the magnetic write field is sufficient to write to the medium. Once the medium cools to ambient temperature, the medium has a sufficiently high value of coercivity to assure thermal stability of the recorded information.

It is believed that reducing or changing the bit cell aspect ratio will extend the bit density limit. However, different approaches will likely be necessary to overcome the limitations of longitudinal magnetic recording.

An alternative to longitudinal recording that overcomes at least some of the problems associated with the superparamagnetic effect is "perpendicular" magnetic recording. Perpendicular magnetic recording is believed to have the capability of extending recording densities well beyond the limits of longitudinal magnetic recording. Perpendicular magnetic recording heads for use with a perpendicular magnetic storage medium may include a pair of magnetically coupled poles, including a main write pole having a relatively small bottom surface area and a flux return pole having a larger bottom surface area. A coil having a plurality of turns is located adjacent to the main write pole for inducing a magnetic field between the pole and a soft underlayer of the storage media. The soft underlayer is located below the hard magnetic recording layer of the storage media and enhances the amplitude of the field produced by the main pole. This, in turn, allows the use of storage media with higher coercive force, consequently, more stable bits can be stored in the media. In the recording process, an electrical current in the coil energizes the main pole, which produces a magnetic field. The image of this field is produced in the soft underlayer to enhance the field strength produced in the magnetic media. The flux density that diverges from the tip into the soft underlayer returns through the return flux pole. The return pole is located sufficiently far apart from the main write pole such that the material of the return pole does not affect the magnetic flux of the main write pole, which is directed vertically into the hard layer and the soft underlayer of the storage media.

When applying a heat or light source to the medium, it is desirable to confine the heat or light to the track where writing is taking place and to generate the write field in close proximity to where the medium is heated to accomplish high areal density recording. In addition, for heat assisted magnetic recording (HAMR) one of the technological hurdles to overcome is to provide an efficient technique for delivering large amounts of light power to the recording medium confined to spots of, for example, 50 nm or less. A variety of transducer designs have been proposed and some have been experimentally tested. Among these are metal coated glass fibers and hollow pyramidal structures with metal walls. For all these approaches, confinement of the light depends on an aperture which is to be fabricated into the end of the structure and gives this kind of transducer the name "aperture probes." Generally these devices suffer from very low light transmission rendering the devices useless for HAMR recording. For example, tapered and metallized optical fibers have demonstrated light confinement down to approximately 50 nm with a throughput efficiency of $10^{-6}$. Pyramidal probes made from anisotropic etching of Si wafers have been designed with throughput efficiencies of $10^{-4}$ for similar spot sizes. Although this is the state of the art, it is still about two orders of magnitude too small for HAMR.

Improvements in throughput efficiency have been achieved for these transducers by changing the taper angles, filling the hollow structures with high index materials, and by trying to launch surface plasmons (SP) on integrated edges and corners of these tip-like structures. Although doing so does increase the throughput to some extent, the most promising SP approach is still very inefficient due to a lack of an efficient SP launching technique. In addition, all aperture probes suffer from a lower limit on spot size which is twice the skin depth of the metal film used to form the aperture. Even for aluminum, the metal with the smallest skin depth for visible light, this corresponds to a spot size of ~20 nm.

Solid immersion lenses (SILs) and solid immersion mirrors (SIMs) have also been proposed for concentrating far field optical energy into small spots. The optical intensity is very high at the focus but the spot size is still determined by the diffraction limit which in turn depends on the refractive index of the material from which the SIL or SIM is made. The smallest spot size which can be achieved with all currently known transparent materials is ~60 nm, which is too large for HAMR.

A metallic pin can be used as a transducer to concentrate optical energy into arbitrarily small areal dimensions. The metallic pin supports a surface plasmon mode which propagates along the pin, and the width of the external electric field generated by the surface plasmon mode is proportional to the diameter of the pin. Smaller pin diameters result in smaller spots, and in principle the spot size can be made arbitrarily small. However, smaller pin diameters also result in much shorter propagation lengths for energy transport. In fact, for a 50 nm spot size the 1/e propagation length of the surface plasmon is typically substantially less than a micron. Therefore, a metallic pin by itself is not useful as a near field transducer.

There is a need for transducers that can provide a reduced spot size and increased throughput efficiencies.

SUMMARY OF THE INVENTION

This invention provides an apparatus for producing a small spot of optical energy comprising a planar waveguide shaped to direct a linearly polarized electromagnetic wave to a focal point within the waveguide, and a metallic pin positioned at the focal point whereby the electromagnetic wave creates surface plasmons on a surface of the pin.

The waveguide can include edges that are shaped to reflect the electromagnetic wave. The edges can have a substantially parabolic shape. The end of the waveguide can be truncated. The planar waveguide can alternatively include a mode index lens for directing the electromagnetic wave to the focal point. The metallic pin can be embedded in the waveguide and can extend through an end of the waveguide.

The apparatus can further comprise means for coupling a linearly polarized electromagnetic wave into the planar waveguide, and the means for coupling a linearly polarized electromagnetic wave into the planar waveguide can comprise a diffraction grating.

The apparatus can further comprise means for phase shifting a portion of the linearly polarized electromagnetic wave. The means for phase shifting can comprise a layer of material having a first section with a first refractive index and a second section with a second refractive index.

The planar waveguide can include a core layer and the means for phase shifting can comprise a first portion of the core layer having a thickness different from a second portion of the core layer.

The means for phase shifting can alternatively comprise a first diffraction grating and a second diffraction grating, where the first diffraction grating and the second diffraction grating are offset in a longitudinal direction.

The apparatus can further include a cladding layer adjacent to one or both sides of the planar waveguide. The cladding layer can have different thicknesses to provide means for phase shifting the electromagnetic wave.

In another aspect the invention can include a means for coupling a linearly polarized electromagnetic wave into the planar waveguide to excite a transverse magnetic waveguide mode. Furthermore, the waveguide thickness can be chosen to be slightly greater than the waveguide cutoff thickness for the transverse magnetic mode.

In another aspect, the invention encompasses an apparatus comprising a pyramidal structure having four substantially flat sides converging to a point, a first material lying adjacent to an exterior of each of the sides and having a first index of refraction, a second material lying adjacent to an interior of each of the sides and having a second index of refraction, and a metallic pin positioned adjacent to the point. The apparatus can further include means for phase shifting a portion of an electromagnetic wave prior to reflection by the sides.

The invention further encompasses an apparatus comprising a conical structure having a first refractive index, a layer of material on a surface of the conical structure, the material having a second refractive index lower than the first refractive index, a metal layer positioned on the layer of material, and a metallic pin positioned adjacent to a point of the conical structure.

The invention also encompasses a recording head comprising a magnetic write pole, a planar waveguide positioned adjacent to the magnetic write pole, the planar waveguide shaped to direct a linearly polarized electromagnetic wave to a focal point within the waveguide, and a metallic pin positioned at the focal point whereby the electromagnetic wave creates surface plasmons on a surface of the pin.

The invention further encompasses a recording head comprising a magnetic write pole, and a waveguide positioned adjacent to the magnetic write pole, the waveguide including a pyramidal structure having four substantially flat sides converging to a point, a first material lying adjacent to an exterior of each of the sides and having a first index of refraction, a second material lying adjacent to an interior of each of the sides and having a second index of refraction, and a metallic pin positioned adjacent to the point.

Another aspect of the invention encompasses a recording head comprising a magnetic write pole, and a waveguide positioned adjacent to the magnetic write pole, the waveguide including a conical structure having a first refractive index, a layer of material on a surface of the conical structure, the material having a second refractive index, lower than the first refractive index, a metal layer positioned on the layer of material, and a metallic pin positioned adjacent to a point of the conical structure.

The invention further encompasses a disc drive comprising means for rotating a storage medium, and means for positioning a recording head adjacent to a surface of the storage medium, wherein the recording head comprises a magnetic write pole, a planar waveguide positioned adjacent to the magnetic write pole, the planar waveguide being shaped to direct a linearly polarized electromagnetic wave to a focal point within the waveguide, and a metallic pin positioned at the focal point whereby the electromagnetic wave creates surface plasmons on a surface of the pin.

DETAILED DESCRIPTION OF THE INVENTION

Figure 1:
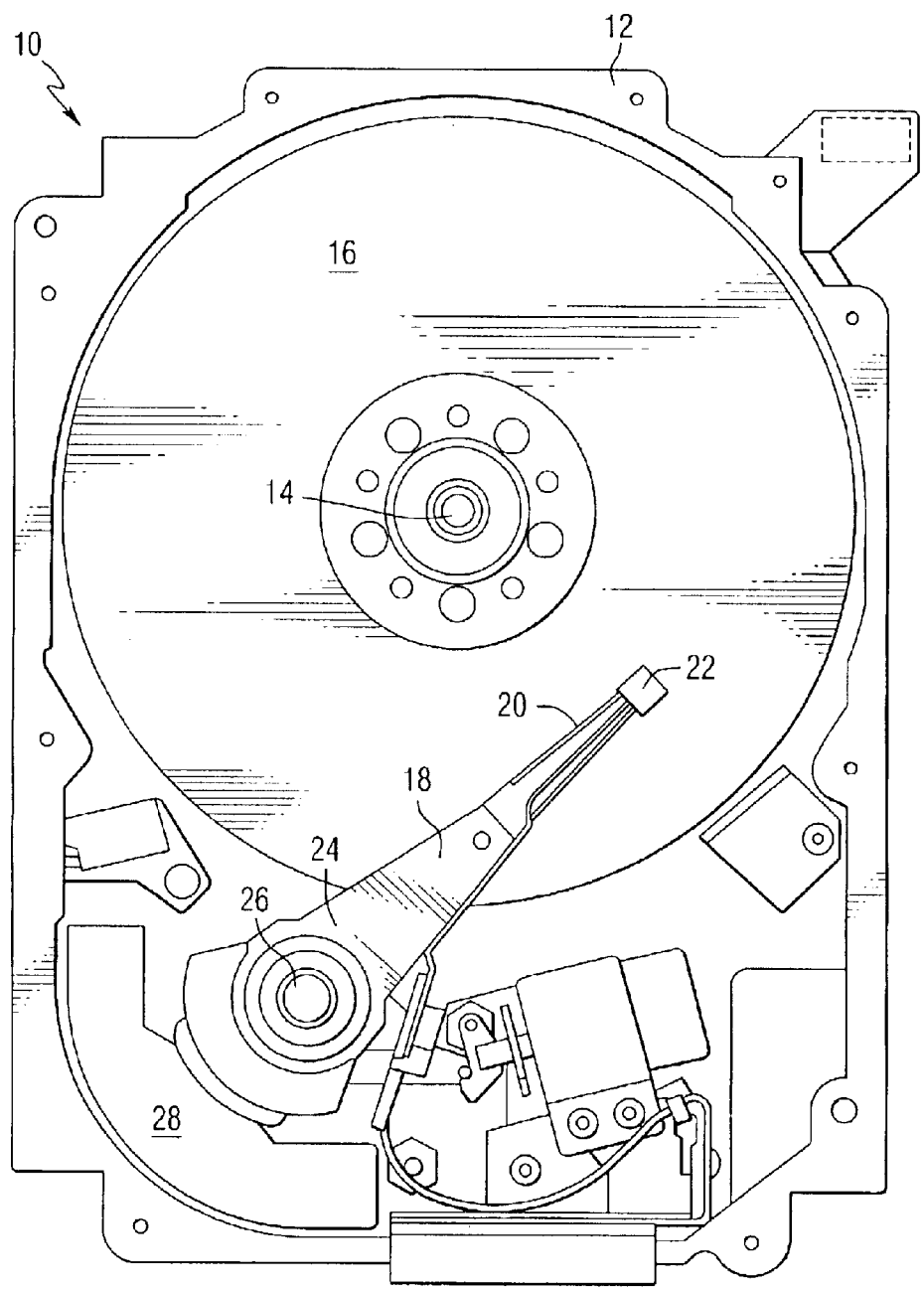
FIG. 1 is a pictorial representation of a magnetic disc drive that can include magnetic heads constructed in accordance with this invention.

This invention encompasses devices that can be used in magnetic and optical recording heads for use with magnetic and/or optical recording media, as well as magnetic and/or optical recording heads that include such devices and disc drives that include the recording heads. FIG. 1 is a pictorial representation of a disc drive 10 that can utilize recording heads constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well known in the art.

For heat assisted magnetic recording, an electromagnetic wave of, for example, visible or ultraviolet light is directed onto a surface of a data storage medium to raise the temperature of the localized area of the medium to facilitate switching of the magnetization of the area. Well known solid immersion lenses (SILs) have been proposed for use in reducing the size of a spot on the medium that is subjected to the electromagnetic radiation. In addition, solid immersion mirrors (SIMs) have been described in the literature. SILs and SIMs may be either three-dimensional or two-dimensional. In the latter case they correspond to mode index lenses or mirrors in planar waveguides. A metallic pin can be inserted at the focus of a SIM to guide a confined beam of light out of the SIM to the surface of the recording medium. This invention provides an efficient means of coupling light from the SIM (or SIL) into the metallic pin.

Figure 2:
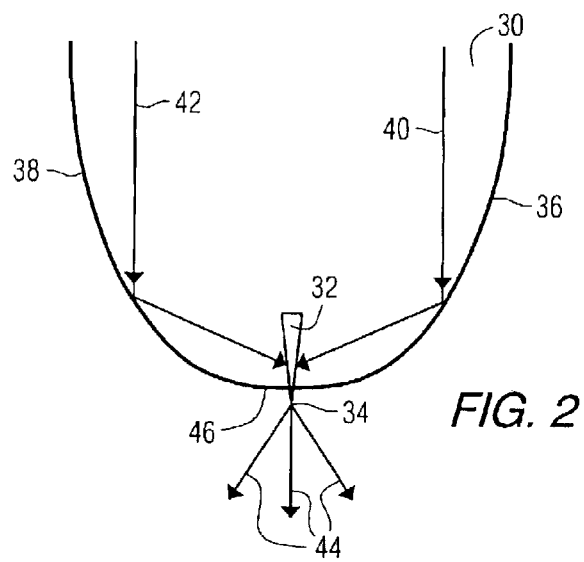
FIG. 2 is a schematic representation of a planar waveguide constructed in accordance with this invention.

Two-dimensional planar waveguides can be used to generate focused beams by means of mode index lenses or planar solid immersion mirrors. FIG. 2 is a schematic representation of a two-dimensional waveguide 30 in the form of a solid immersion mirror, including a metallic pin 32 embedded in an end of the waveguide. The tip 34 of the pin extends beyond the waveguide. The waveguide includes edges 36, 38 having a substantially parabolic shape in the example shown in FIG. 2. Due to differences in refractive index between the waveguide and the adjacent material, an electromagnetic wave traveling in the axial direction through the waveguide as illustrated by arrows 40 and 42 would be reflected by the waveguide onto the surface of the metallic pin. If the electric field at the focal point is parallel to the axis of the pin then it can couple to the pin and generate surface plasmons along the surface of the pin. Near field radiation then emanates from the tip of the pin as illustrated by arrows 44. The metallic pin placed at the focus concentrates the light to a much smaller spot than would be possible with a mode index lens or SIM alone. The waveguide can be truncated at the end 46 adjacent to the pin so that most of the incoming electromagnetic wave strikes the edges of the waveguide at an angle less than some predetermined angle, such as 45°. For a linearly polarized collimated electromagnetic wave, edges having a parabolic shape will focus the wave to a focal point. However, it should be understood that other edge shapes can be used if the incoming wave is conditioned such that the combination of the wave characteristics and the edge shape result in the desired focusing of the wave at the pin. The pin can have a rectangular cross-section and can be tapered to a point. However, pins having other cross-sectional shapes can also be used.

The waveguide can be made of, for example, a high index dielectric core material like $TiO_2$, $Ta_2O_5$, Si, SiN, or ZnS depending on the wavelength and refractive index desired. For example, Si has a very large index of 3.5 at a wavelength of 1550 nm in the near infrared, but it is not transparent to visible light. $Ta_2O_5$ has a lower index of about 2.1, but is transparent throughout the near infrared and visible. The waveguide also contains dielectric cladding layers on either side of the core. The cladding layer must have a lower refractive index than the core layer. Preferably the difference in refractive index between the core and cladding should be as large as possible. Air is a suitable dielectric for one side of the cladding. Other dielectrics that could be used as cladding layers include $SiO_2$ with an index of 1.5 and $Al_2O_3$ with an index of about 1.8.

When the invention is used with a transverse electric (TE) mode electromagnetic wave, means can be provided to phase shift a portion of the electromagnetic wave. This phase shift can be achieved by providing a means for launching the two-dimensional analog of a radially polarized wave into the planar waveguide. We term this a split linear polarization waveguide mode. Two methods are described below for achieving the split linear polarization. The first technique modifies half of the planar waveguide by changing the refractive index of the core or cladding dielectrics and/or the thickness of the core or cladding dielectrics in the waveguide in one section as shown in the FIG. 3. The planar waveguide 50 of FIG. 3 includes a first section 52 of the core dielectric having an effective index of refraction of $n_1$ (which is a function of the index of refraction and thickness of all core and cladding layers in the waveguide), and a second section 54 of the core dielectric having an effective index of refraction of $n_2$. The length of section 54 in an axial direction is designated as $d_1$. Light enters the waveguide as illustrated by arrows 56 and 58. The incident light is linearly polarized in the plane of the waveguide. Arrows 60, 62, 64, 66, 68 and 70 illustrate the electric field of the incident light. Arrows 60 and 62 show that the electric field component of the incident light initially lies in the plane of the waveguide for transverse electric polarization. Section 54 of the waveguide causes a differential phase shift between the waveguide mode in the two halves of the waveguide such that the electromagnetic field of light exiting section 54, as illustrated by arrow 66, is 180° out of phase with respect to light passing through section 52, as illustrated by arrow 64. As the light is reflected at the edges of the waveguide, the reflected waves illustrated by arrows 72 and 74 have electric fields as illustrated by arrows 68 and 70 that include both longitudinal and transverse components in the case of TE polarization. Where the reflected waves meet, the transverse components cancel, leaving the longitudinal components that add to produce an electric field that is axially aligned with the waveguide and used to excite surface plasmons on the metal tip 76. This axial field is desirable to improve the fraction of energy that exits the waveguide.

The time required for the electromagnetic wave to propagate through a section of waveguide is determined by the effective refractive index and length of the section. The refractive index and length can be chosen so that there is a net phase shift of 180° between the wave propagating through the first section and the wave propagating through the second section. This can be represented by, $$|(n_1 - n_2)d| = \frac{\lambda}{2} \quad (1)$$

where $n_1$ and $n_2$ are the effective refractive indices of the TE waveguide mode in the first and second sections, d is length of the second section, and $\lambda$ is the wavelength of the incident electromagnetic radiation. The effective refractive index is a function of the core and cladding refractive indices and thicknesses as well as the polarization state. There are many ways to get the index change $n_2$ with respect to FIG. 3. For example, the index can be changed by varying the thickness of the waveguide, using ion implantation, or strip loading the waveguide with a metal, etc.

Figure 3:
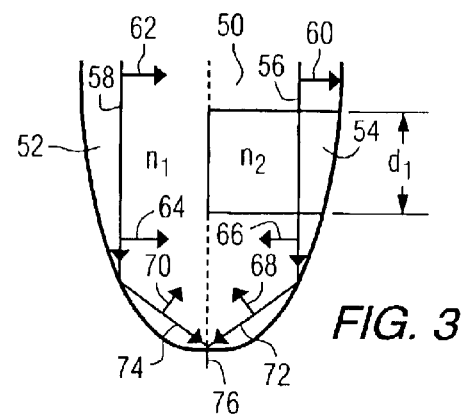
FIG. 3 is a schematic representation of another planar waveguide constructed in accordance with this invention.
Figure 6:
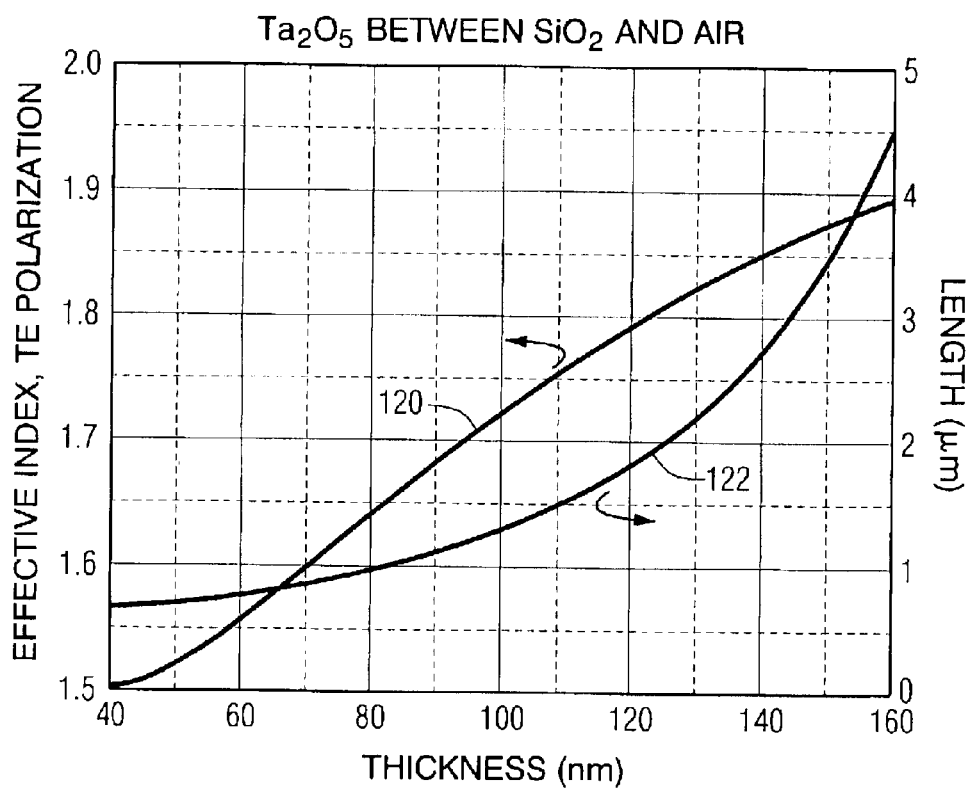
FIG. 6 is a graph of thickness vs. effective index.

Referring to the structure of FIG. 3, if we assume that the planar waveguide is comprised of $Ta_2O_5$ with a thickness of 200 nm, then the required length for the modified section is shown by line 122 of the graph of FIG. 6, a function of $Ta_2O_5$ film thickness. For example, a $Ta_2O_5$ film with a thickness of 100 nm would have an effective index of 1.76 and the section length 54 should be about 1.2 μm long in order to generate a net phase shift of 180°. Alternatively, the entire waveguide could start with a $Ta_2O_5$ thickness of 100 nm, and a 1.2 μm long modified section 54 of 200 nm thick $Ta_2O_5$ could be used instead. This would also generate a 180° phase shift.

Figure 4:
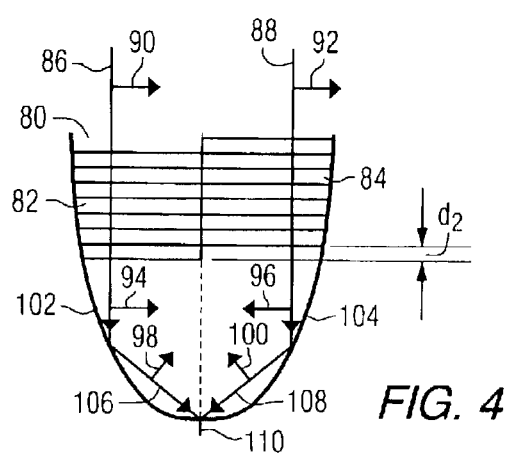
FIG. 4 is a schematic representation of another planar waveguide constructed in accordance with this invention.

An alternative technique for generating a split linearly polarized planar waveguide mode makes use of a diffraction grating to launch the planar mode, as illustrated in FIG. 4. FIG. 4 shows a two-dimensional waveguide 80 in the form of a solid immersion mirror, including first and second diffraction gratings 82 and 84. Diffraction gratings are commonly used to inject light into a planar waveguide. To generate split linear polarization the two diffraction gratings 82 and 84 are used with a longitudinal offset between them as shown in FIG. 4. The diffraction gratings are offset by a distance $d_2$.

Figure 5:
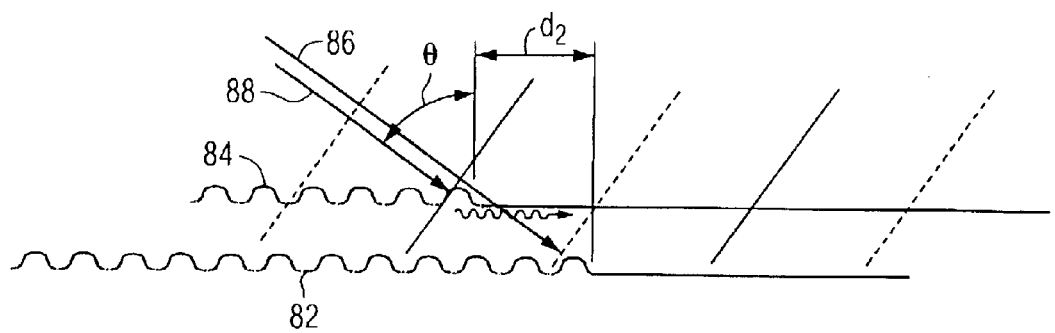
FIG. 5 is a schematic representation of two diffraction gratings.

The purpose of the dual grating is to introduce a relative 180° phase shift between the two halves of the beam. Arrows 86 and 88 illustrate an incident electromagnetic wave having an electric field represented by arrows 90, 92, and a transverse electric waveguide mode having an electric field represented by arrows 94, 96, 98 and 100. As shown by arrows 90 and 92, the electric field of the incident wave is initially linearly polarized in the plane of the waveguide for TE modes. Grating 82 is used to launch the wave into one half of the waveguide. Grating 84 is used to launch the wave into the other half of the waveguide. The longitudinal offset in the position of the two gratings causes a 180° phase shift to occur between the two waveguide modes as shown by arrows 94 and 96. After reflection from the edges 102 and 104 of the waveguide, the reflected waves as illustrated by arrows 106 and 108 have electric fields that include both longitudinal and transverse components in the case of TE polarization. When the reflected waves meet at the focal point, the transverse components of the electric fields cancel and the longitudinal components of the electric fields add. This excites surface plasmons on the metallic pin 110. The offset between the gratings is given by the formula:

$$offset = \frac{\lambda}{2(n_{eff} - n_{inc}\sin\theta)} \quad (2)$$

where θ is the angle of incidence, $n_{eff}$ is the effective index of refraction for the waveguide mode, and $n_{inc}$ is the refractive index of the incident medium. As shown in FIG. 5 the incident collimated laser beam reaches the end of the first portion of the waveguide before it reaches the end of the second portion of the waveguide. The time difference is:

$$t_1 = \frac{n_{inc}d\sin\theta}{c}. \quad (3)$$

At the end of the first grating the waveguide mode begins propagating with a phase velocity of $$v_p = \frac{c}{n_{eff}}. \quad (4)$$

It reaches the end of the second grating after the interval $$t_2 = \frac{n_{eff}d}{c}. \quad (5)$$

The time interval between $t_1$ and $t_2$ is sufficient to generate a 180° phase shift in the propagating waveguide mode, $$t_2 - t_1 = \frac{d}{c}(n_{\mathit{eff}} - n_{\mathit{inc}}\sin\theta) = \frac{1}{2f} = \frac{\lambda}{2c}. \quad (6)$$

This equation reduces to Equation (2).

The waveguide can be positioned on a surface of a substrate of, for example, $SiO_2$. For a waveguide constructed as shown in FIG. 4, for TE polarization at a wavelength of 400 nm, the effective index of refraction of a 40 nm $Ta_2O_5$ waveguide on an $SiO_2$ substrate is 1.553. For a 45° angle of incidence in air of the collimated laser beam onto the waveguide, the offset should be 236 nm. As a second example, for TE polarization at a wavelength of 633 nm and a 50 nm $Ta_2O_5$ waveguide on an $SiO_2$ substrate the effective index is 1.469, so the offset should be 415 nm for a 45° angle of incidence of the laser beam in air. As a third example, for TE polarization at a 1550 nm wavelength and a 100 nm Si waveguide on an $SiO_2$ substrate the effective index is 2.129, so the offset should be 545 nm for a 45° angle of incidence of the laser beam in air.

FIG. 5 is a schematic representation of the two diffraction gratings 82 and 84 of FIG. 4. FIG. 5 shows the grating offset and the incident light represented by arrows 86 and 88.

FIG. 6 is a graph of the effective index 120 for a waveguide comprised of a $Ta_2O_5$ core (n=2.2) sandwiched between $SiO_2$ (n=1.5) and air cladding layers at a wavelength of 633 nm for TE polarization vs. thickness of the waveguide. As the film gets very thick its effective index approaches that of the bulk $Ta_2O_5$, i.e. 2.2. As the film gets very thin, its effective index drops towards that of the $SiO_2$ substrate, i.e. 1.5. For film thicknesses below about 40 nm there are no propagating TE modes.

Figure 7:
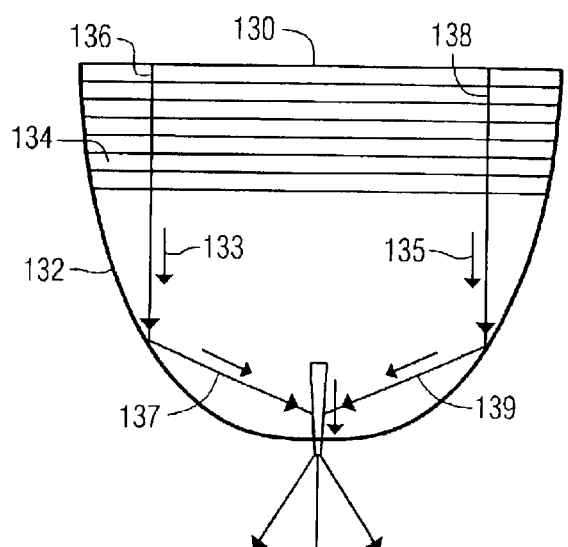
FIG. 7 is a schematic representation of another planar waveguide constructed in accordance with this invention.

Another way of exciting the metallic pin with a strong z-polarization is to excite a TM mode in the waveguide near the cutoff dimension of the waveguide rather than the TE mode as discussed above. A waveguide that uses a TM mode is illustrated in FIG. 7. The planar waveguide 130 of FIG. 7 includes a layer 132 of transparent material such as $Ta_2O_5$ on a surface of a substrate, such as $SiO_2$. A single grating 134 is provided for coupling light into the waveguide. Light enters the waveguide as illustrated by arrows 136 and 138. The incident light is polarized in the plane of incidence and perpendicular to the plane of the waveguide so that the electric field within the waveguide has a component that lies in the plane of the waveguide along the direction of propagation as shown by arrows 133 and 135 and another component that lies perpendicular to both the direction of propagation and the plane of the waveguide. This is illustrated in a side view in FIG. 9. The electric field component which lies along the direction of propagation is $E_z$, and the electric field component which is perpendicular to the direction of propagation and the plane of the waveguide is $E_y$. After reflecting from the edge of the waveguide, the electric field component $E_y$ is unchanged, but the electric field component $E_z$ is divided into a longitudinal component parallel to the pin, $E_L$, and a transverse component, $E_T$, perpendicular to the pin. Where the reflected waves 137 and 139 in FIG. 7 meet, the electric fields add together generating a total electric field which has one component parallel to the pin, $E_L$, and another component perpendicular to both the waveguide and the pin (denoted by $E_y$ in FIG. 9). The transverse field components, $E_T$, cancel. As the thickness of the core is reduced towards the cutoff thickness, the component $E_L$ of the electric field which lies parallel to the pin increases relative to the component $E_y$ that lies perpendicular to both the plane of the waveguide and the pin. Because the component that lies perpendicular to the pin does not efficiently couple into the pin, the waveguide should be designed to operate near its cutoff for which the amplitude of the electric field component in the plane of the waveguide is maximized in order to transfer electromagnetic energy most efficiently into the pin.

Figure 8:
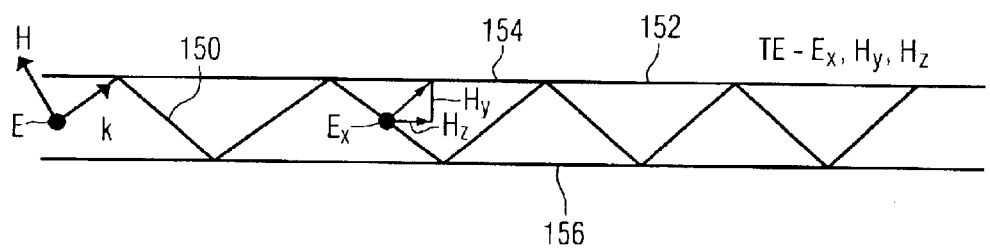
FIG. 8 is a schematic representation of a TE mode wave in a waveguide.

FIG. 8 is a schematic representation of a TE mode wave in a waveguide. In FIG. 8, an electromagnetic wave 150 is shown within a waveguide 152. The electromagnetic wave is polarized in the TE mode such that the electric field is perpendicular to the plane of the figure and the magnetic field H has components $H_y$ and $H_z$, with component $H_z$ lying in a direction parallel to the axis of the waveguide. The electromagnetic wave can be seen to reflect off of the sides 154 and 156 as it travels along the waveguide.

Figure 9:
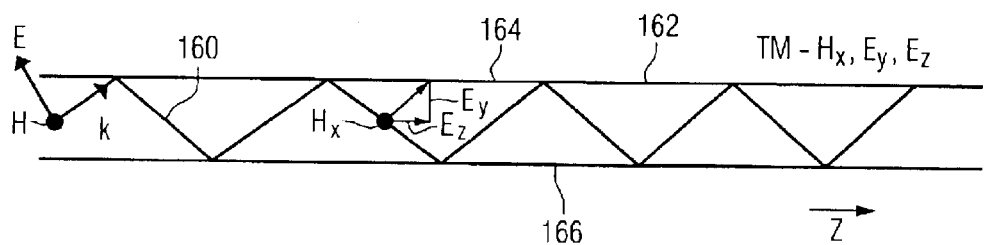
FIG. 9 is a schematic representation of a TM mode wave in a waveguide.

FIG. 9 is a schematic representation of a TM mode wave in a waveguide. In FIG. 9, an electromagnetic wave 160 is shown within a waveguide 162. The electromagnetic wave is polarized in the TM mode such that the magnetic field is perpendicular to the plane of the figure and the electric field E has components $E_y$ and $E_z$, with component $E_z$ lying in a direction parallel to the axis of the waveguide. The electromagnetic wave can be seen to reflect off of the sides 164 and 166 as it travels along the waveguide.

From FIG. 9 it is apparent that for the TM mode, there is a component of the electric field in the z-direction. The closer the mode is to cutoff, the stronger the z-component. The TM mode can be excited by a single grating and does not require the offset grating shown in FIG. 4. By using a TM mode, the phase shifting means of FIG. 4 can be eliminated.

For some transducers it is desirable to use a radially polarized electromagnetic wave. Radial polarization may be understood by referring to FIG. 10. A radially polarized electromagnetic wave includes an electric field component that lies in a plane 170 that is perpendicular to the direction of travel represented by a k vector 172, and is represented by arrows 174, 176, 178 and 180.

Figure 11:
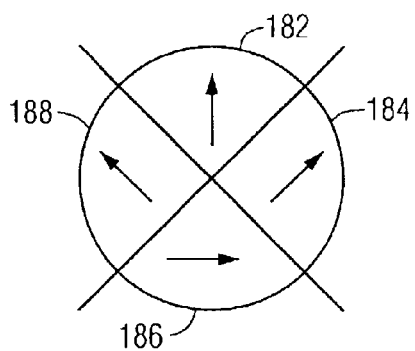
FIG. 11 is a schematic representation of a composite wave plate for generating radial polarization.

The magnetic field, H, for a radially polarized wave is circumferential with respect to the k vector. Techniques for generating a radially polarized wave are well known. For example, two half-wave plates can be cut into quarters 182, 184, 186 and 188 and rearranged into a single wave plate with fast axes as shown in FIG. 11.

Figure 12:
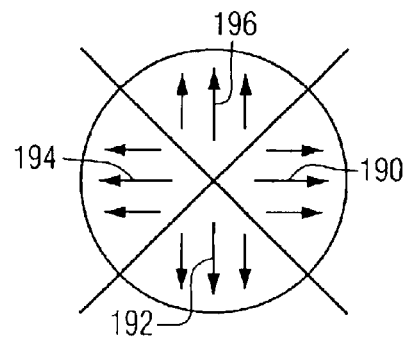
FIG. 12 is a schematic representation of pseudo-radial polarization for the light transmitted by the waveplate.

A half wave plate has the property that it rotates the plane of polarization by twice the angle of the wave plate. Therefore, if a plane wave uniformly polarized in the vertical direction is incident upon the modified wave plate, the transmitted polarization will be as illustrated by the arrows 190, 192, 194 and 196 in FIG. 12.

Figure 10:
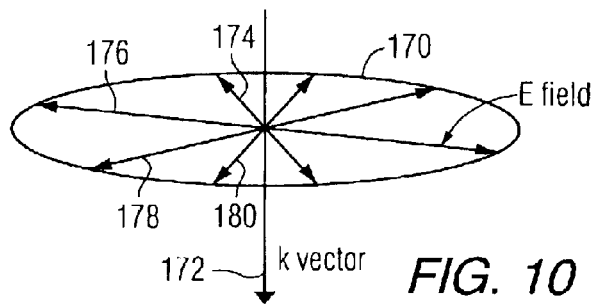
FIG. 10 is a schematic illustration of radial polarization in an electromagnetic wave.

The transmitted polarization has a strong radial component and a smaller circumferential component. The circumferential component can be eliminated by focusing the beam through a spatial pinhole filter which strongly attenuates the circumferential components relative to the radial components. The result will be a radially polarized beam as shown in FIG. 10. There are other methods for generating radially polarized beams as well.

Figure 13:
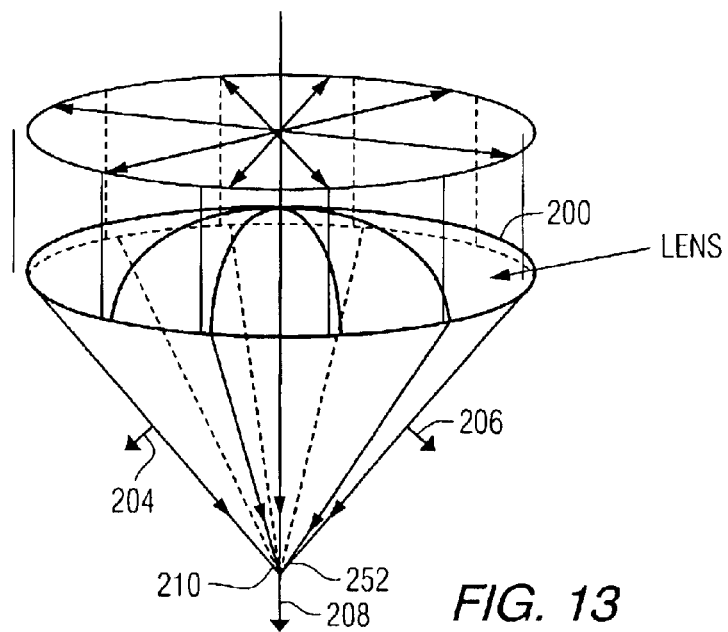
FIG. 13 is a schematic illustration of a radially polarized beam incident upon a solid immersion lens.

If this radially polarized beam is incident upon either a solid immersion lens (SIL) or a solid immersion mirror (SIM) it will be brought to a focus. FIG. 13 is a schematic representation of a SIL 200 that is used to focus a radially polarized wave. At the focus 202, the components of the electric field, illustrated by arrows 204, 206, tend to cancel leaving only an electric field component that lies along the axis of propagation 208.

Figure 14:
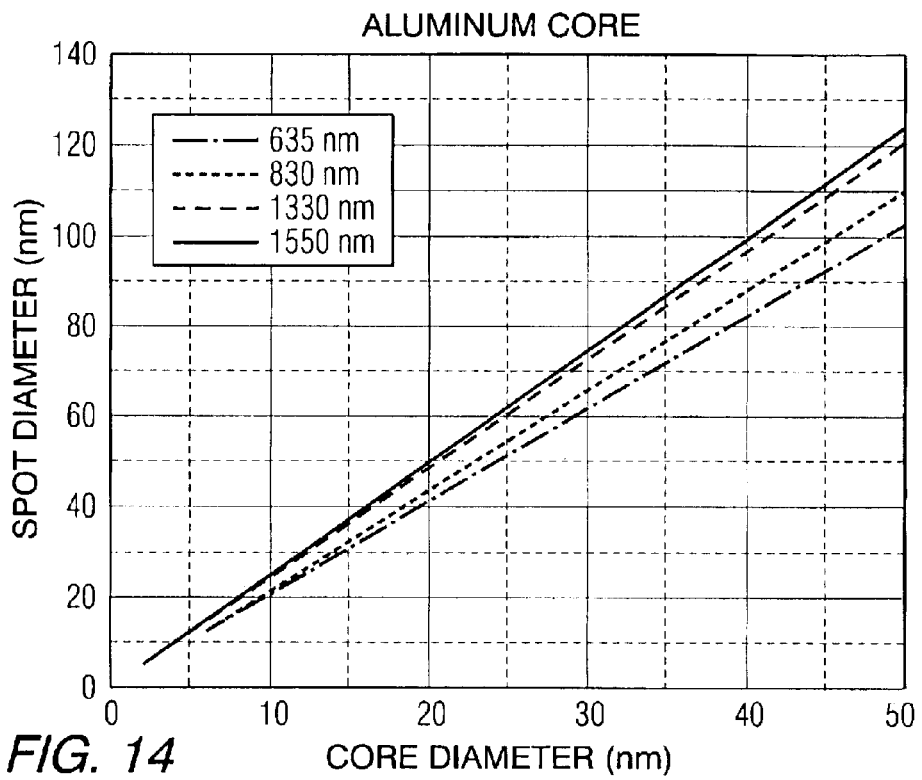
FIG. 14 is a graph of spot diameter vs. core diameter.

This axial electric field polarization for either a SIL or a SIM can be used in combination with a metallic pin 210 at the focus to provide a reduced size optical spot with improved throughput efficiency. The pin does not need to be very long, only on the order of the depth of focus or about a wavelength. The length of the pin can be optimized to support a resonant mode and radiate light efficiently from its lower end. The metal pin can support a surface plasmon resonance propagating along it axially. The field can be tightly confined by making the diameter of the pin small. However, as the diameter of the pin is reduced the propagation length of the SP mode also decreases. For an aluminum pin the diameter of the spot as a function of the diameter of the pin is shown in FIG. 14. For a 50 nm spot size the metallic pin should be about 20 nm in diameter. The data in FIG. 14 is for an infinite cylindrical pin. For a finite cylinder or a pointed pin, the spot size will be similar or even smaller.

Figure 15:
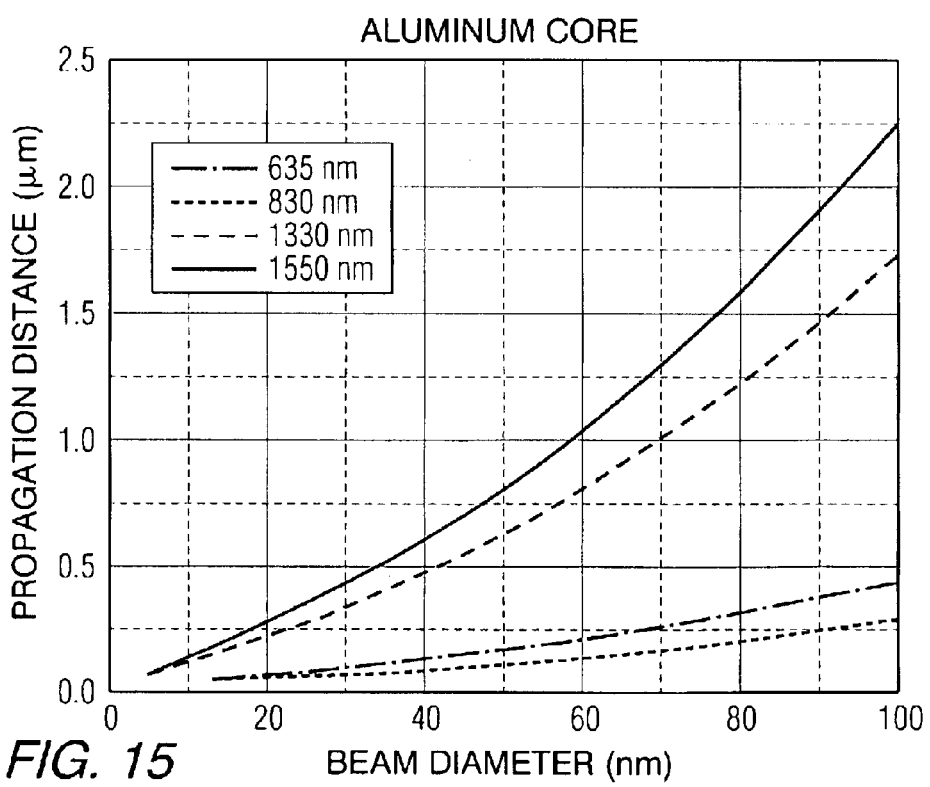
FIG. 15 is a graph of beam diameter vs. propagation distance.

The propagation length as a function of pin diameter is shown in FIG. 15. The propagation length is defined as the distance for which the amplitude of the wave drops to 1/e of its initial value. A pin diameter of 20 nm corresponds to a propagation distance of only 300 nm at a wavelength of 1550 nm. For these calculations the metal pin is surrounded by a dielectric with index=2.2.

In order to allow the SP mode to propagate a longer distance, the pin could be cone shaped with its point near the bottom of the SIL or SIM. As the diameter of the pin increases the propagation length of the SP mode also increases. So energy which is incident upon the conical pin at the end opposite that of the point would be able to propagate more easily to the point.

Figure 16:
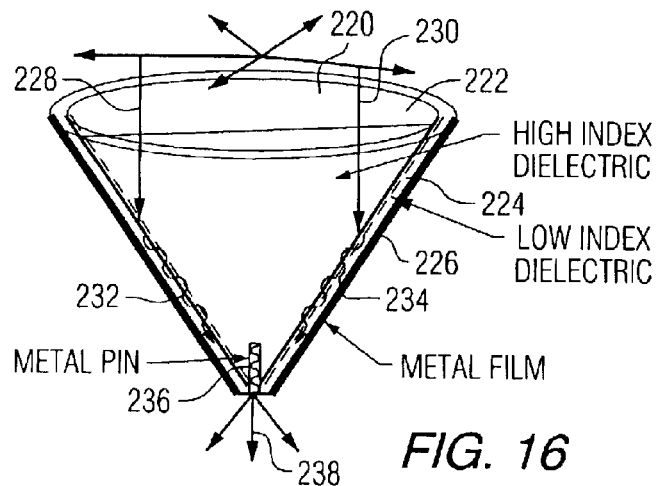
FIG. 16 is a schematic representation of a conical transducer constructed in accordance with this invention.

Different kinds of aperture probes can also be combined with radially polarized light and a metallic pin transducer to confine the power. A three-dimensional design is illustrated in FIG. 16. The structure of FIG. 16 includes a tapered cylindrically symmetric optical fiber 220 comprising a generally cone shaped section of high dielectric material 222, and a layer of low dielectric material 224 on an outer surface of the high dielectric material. A thin film coating of metal 226 is deposited on the surface of the low dielectric material. When light enters the structure as shown by arrows 228 and 230, surface plasmons 232 and 234 are generated along the interface between the low dielectric material and the metal layer. The surface plasmons are used to excite a metallic pin 236 that radiates the electromagnetic wave as illustrated by arrows 238. The taper angle is chosen in conjunction with the thin films to optimally excite the SP mode with collimated and radially polarized light.

Figure 17:
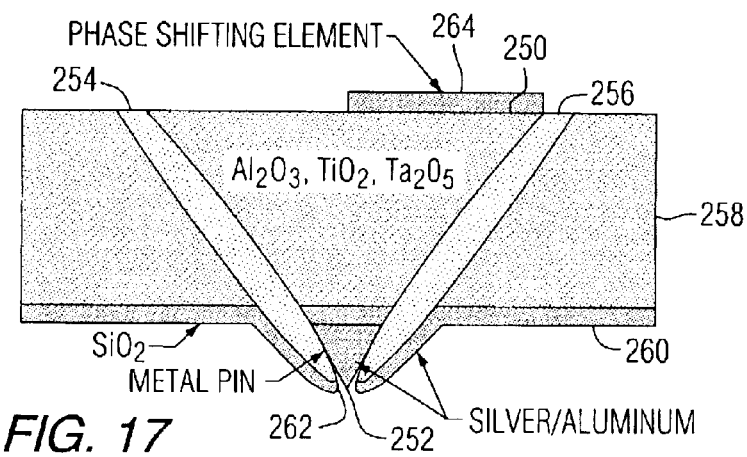
FIG. 17 is a schematic representation of a pyramidal transducer constructed in accordance with this invention.

Another design, illustrated in FIG. 17, is based on commercially available pyramidal hollow metal aperture probes. To construct the waveguide of this invention, the fabrication process must be modified to produce the metallic pin. The structure of FIG. 17 includes a four-sided transparent dielectric pyramid 250 having a metallic pin 252 located at a tip thereof. The dielectric pyramid may be composed of a high index dielectric like $Ta_2O_5$ or $TiO_2$ or a low index dielectric like $SiO_2$ or $Al_2O_3$. A second transparent low index dielectric material indicated by 254 and 256 is coated over the pyramid and metallic pin. This dielectric material may be $SiO_2$. The resulting structure is embedded in a substrate 258. The pin and ends of the dielectric layers protrude from a surface of the substrate. A layer 260 of metal, such as silver or aluminum, is positioned on the surface of the substrate and adjacent to the protruding portions of the dielectric layer 254 and 256. An opening 262 is provided adjacent to the tip of the metallic pin. A phase shifting element 264 can be included as shown in FIG. 17 to serve the same function as the phase shifting elements described in FIGS. 3 and 4, that is, to convert a linearly polarized waveguide mode into a split linear polarization. Two-dimensional structures such as the waveguide of FIG. 17 can also be readily fabricated using conventional micro-electromechanical systems technologies that rely on tapering rather than on focusing by parabolic or ellipsoidal structures. In each case, split linearly polarized light or radially polarized light can be used to effectively launch a SP on the metallic pin that is to be used to transfer/confine the optical power.

Figure 18:
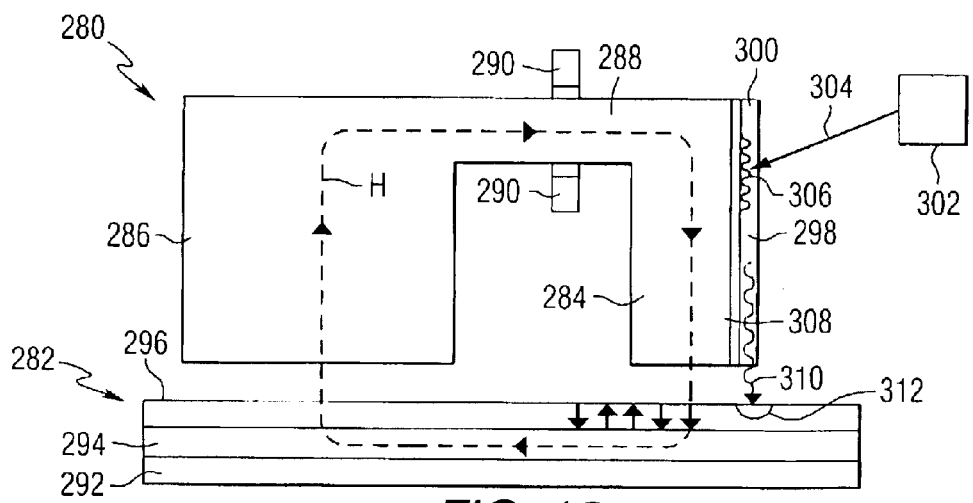
FIG. 18 is a schematic representation of a recording head including the waveguide of this invention.

FIG. 18 is a partially schematic side view of a heat assisted magnetic recording head 280 and a magnetic recording medium 282. Although an embodiment of the invention is described herein with reference to recording head 280 as a perpendicular magnetic recording head and the medium 282 as a perpendicular magnetic recording medium, it will be appreciated that aspects of the invention may also be used in conjunction with other types of recording heads and/or recording mediums where it may be desirable to employ heat assisted recording. Specifically, the recording head 280 may include a writer section comprising a main write pole 284 and a return or opposing pole 286 that are magnetically coupled by a yoke or pedestal 288. It will be appreciated that the recording head 280 may be constructed with a write pole 284 only and no return pole 286 or yoke 288. A magnetization coil 290 surrounds the yoke or pedestal 288 for energizing the recording head 280. The recording head 280 also may include a read head, not shown, which may be any conventional type read head as is generally known in the art. The waveguide can alternatively be positioned on the other side of the pole. In another example, the pin and the pole can be the same material, in which case the pin can function as both the electromagnetic transducer and the source of the field.

Still referring to FIG. 18, the recording medium 282 is positioned adjacent to or under the recording head 280. The recording medium 282 includes a substrate 292, which may be made of any suitable material such as ceramic glass or amorphous glass. A soft magnetic underlayer 294 may be deposited on the substrate 292. The soft magnetic underlayer 294 may be made of any suitable material such as, for example, alloys or multilayers having Co, Fe, Ni, Pd, Pt or Ru. A hard magnetic recording layer 296 is deposited on the soft underlayer 294, with the perpendicular oriented magnetic domains contained in the hard layer 296. Suitable hard magnetic materials for the hard magnetic recording layer 296 may include at least one material selected from, for example, FePt or CoCrPt alloys having a relatively high anisotropy at ambient temperature.

The recording head 280 also includes a planar waveguide 298 that directs light received from a light source onto a surface of a recording medium to heat the magnetic recording medium 282 proximate to where the write pole 284 applies the magnetic write field H to the recording medium 282. The planar waveguide includes a light transmitting layer 300. The optical waveguide 298 acts in association with a light source 302 which transmits light, for example via an optical fiber 304, that is coupled to the optical waveguide 298, by a coupling means such as a grating 306. The light source 302 may be, for example, a laser diode, or other suitable laser light sources. This provides for the generation of a guided mode that may propagate through the optical waveguide 298 toward the recording medium. EM radiation, generally designated by reference number 310, is transmitted from the waveguide 298 for heating the recording medium 282, and particularly for heating a localized area 312 of the recording layer 296.

The optical waveguide 298 can be constructed in accordance with any of the waveguides set forth in FIGS. 2, 3, 4, 7, 16 or 17.

The waveguides of this invention can also be used in optical recording applications in which either a magnetic field is not needed, such as write once and phase change recording, or where an external magnet could be positioned below the substrate, such as in magneto-optic recording. Alternatively, these structures could potentially be useful in a probe storage application.

Figure 19:
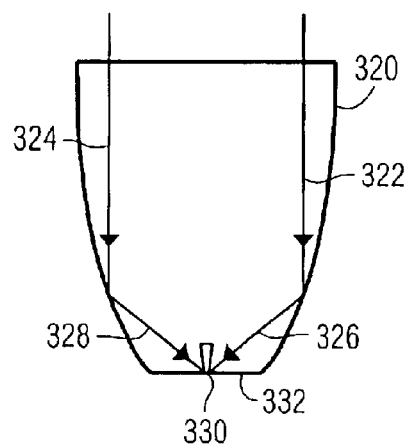
FIG. 19 is a schematic representation of a truncated solid immersion mirror constructed in accordance with this invention.
Figure 20:
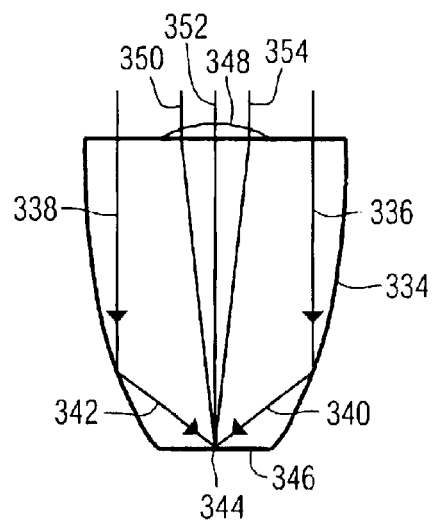
FIG. 20 is a schematic representation of another truncated solid immersion mirror constructed in accordance with this invention.

This invention also encompasses three-dimensional waveguides as illustrated in FIGS. 19 and 20. FIG. 19 is a schematic representation of a truncated solid immersion mirror 320 constructed in accordance with this invention. Electromagnetic waves enter the SIM as illustrated by arrows 322 and 324 and are reflected off of the sides as illustrated by arrows 326 and 328. This focuses the light at a focal point 330. The focal point is positioned adjacent to a truncated edge 332 of the SIM.

FIG. 20 is a schematic representation of another truncated solid immersion mirror 334 constructed in accordance with this invention. Electromagnetic waves enter the SIM as illustrated by arrows 336 and 338 and are reflected off of the sides as illustrated by arrows 340 and 342. This focuses the light at a focal point 344. The focal point is positioned adjacent to a truncated edge 346 of the SIM. A focusing means 348 is positioned to focus electromagnetic waves that enter near the center of the input edge of the SIM, as illustrated by arrows 350, 352 and 354.

The SIMs of FIGS. 19 and 20 use total internal reflection to direct the light rays from an incident collimated beam of light towards a focal point at the bottom surface of the SIM. Because all of the rays converge within the high index medium of the SIM, the minimum spot size is equivalent to that of a solid immersion lens. However, there are no longer practical difficulties in feeding the SIM or mounting the SIM, so the minimum spot size realized in practice is much closer to the theoretical limit.

The structures of FIGS. 19 and 20 are truncated solid immersion mirrors in which there is no refraction except at the top lens surface in FIG. 20, but instead, rays are redirected by total internal reflection to the focus of the mirror. Light rays which enter a parabolic mirror parallel to the optical axis of the parabola are brought into focus at the focal point of the parabola as shown in FIGS. 19 and 20. The truncated parabolic lens is made of a material which has a high index of refraction compared to the surrounding medium. The lens is truncated at a plane which cuts through the focal point of the lens. The maximum angle of incidence of the marginal ray on the parabolic surface varies. In the embodiment of FIG. 19 it is 45O. In order to ensure total internal reflection for all rays in the incident beam, the critical angle equation must be satisfied as follows.

$$n_{med} = n_{SH} \sin 6_{max} = \sqrt{2} \cdot n_{SH}. \quad (7)$$

If the SIM is made of glass with an index of refraction of 1.5, then the surrounding medium can be air, with N=1, and all light rays striking the parabolic curve of the SIM will be totally reflected. In order to efficiently reflect light rays incident below the critical angle, the surface of the SIM in the region below the critical angle would need to be coated with a metallic reflector like silver or aluminum.

There is a region in the center of the embodiment of FIG. 19 where incident light does not contribute to the focused spot. It is possible to shape the top surface of the SIM, or to affix a second piano-convex lens to this surface, to also focus these rays as shown in FIG. 20. However, these low angle rays are not as important for generating a small focused spot. The SIM can also be fabricated from a material with a graded refractive index in the radial direction to both focus the light in the center region of the SIM and to reduce the critical angle required for total internal reflection. However, doing this would make the SIM dispersive and monochromatic light would be required.

The truncated parabolic SIM design can be easily mounted at its top edge without interfering with the incident high angle rays. The lens should be essentially achromatic because the light rays are reflected rather than refracted (except for the top surface plano-convex lens if present), and the angle of reflection is independent of wavelength or refractive index. Finally, another advantage of this design is that often the incident collimated beam has a Gaussian intensity profile. In a conventional SIL design, the outer highest angle light rays which are the most important for generating the smallest spot size are generated from the edges of the Gaussian beam with the lowest intensity. In this parabolic SIM design, however, the highest angle rays reflected to the focal point come from nearer to the center of the incident beam and, therefore, will have a higher intensity.

It is also possible that the waveguide can include only one parabolic edge and another edge that is a different shape, such as straight. This structure could enable some head geometries that might be more amenable to fabrication.

Figure 21:
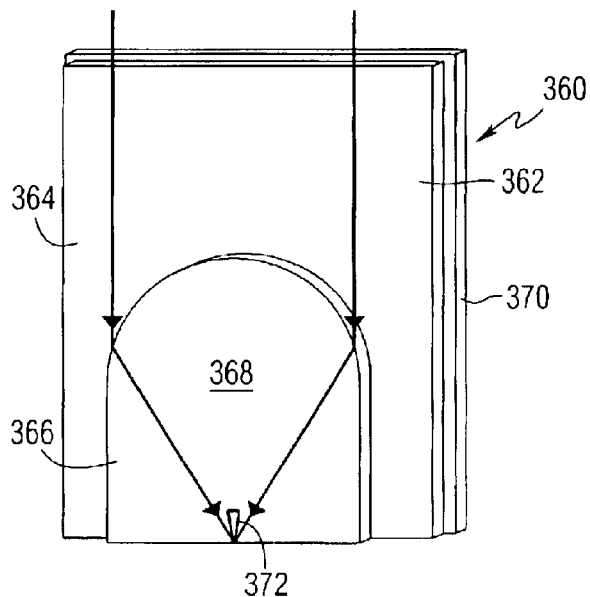
FIG. 21 is an isometric view of another waveguide constructed in accordance with this invention.

FIG. 21 is an isometric view of another waveguide 360 constructed in accordance with this invention. Waveguide 360 includes a core layer 362 having a first portion 364 of a first thickness and a second portion 366 of a second thickness and shaped to form a mode index lens 368. A cladding layer 370 is positioned adjacent to one side of the waveguide. A pin 372 is positioned at the focal point of the mode index lens.

Figure 22:
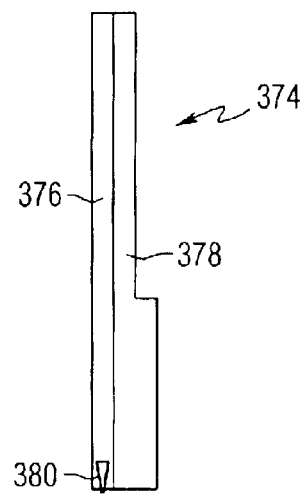
FIG. 22 is a side elevation view of another waveguide constructed in accordance with this invention.

FIG. 22 is a side elevation view of another waveguide 374 constructed in accordance with this invention. Waveguide 374 includes a core layer 376 and a cladding layer 378 is positioned adjacent to one side of the waveguide. The thickness of the cladding layer can be varied to provide a means for phase shifting the electromagnetic wave in the waveguide. Pin 380 is positioned at the focal point of the waveguide. It should be recognized that the cladding layer can be positioned on either one side or both sides of the core layer.

While the present invention has been described in terms of several examples, it will be apparent to those skilled in the art that various changes can be made to the disclosed examples without departing from the scope of the invention as defined by the following claims.

What is claimed is:

1. An apparatus comprising:
   a planar waveguide shaped to direct a linearly polarized electromagnetic wave to a focal point within the waveguide; and
   a metallic pin positioned at the focal point.

2. The apparatus of claim 1, wherein the waveguide includes edges for reflecting the electromagnetic wave toward the focal point.

3. The apparatus of claim 2, wherein the edges have a substantially parabolic shape.

4. The apparatus of claim 3, wherein an end of the waveguide adjacent to the pin is truncated.

5. The apparatus of claim 1, wherein the planar waveguide forms a mode index lens.

6. The apparatus of claim 1, wherein the pin extends through an end of the planar waveguide.

7. The apparatus of claim 1, further comprising means for phase shifting a portion of the linearly polarized electromagnetic wave.

8. The apparatus of claim 7, wherein the means for phase shifting comprises:
   a layer of material having a first section with a first refractive index and a second section with a second refractive index.

9. The apparatus of claim 7, wherein the planar waveguide includes a core layer and the means for phase shifting comprises:
   a first portion of the core layer having a thickness different from a thickness of a second portion of the core layer.

10. The apparatus of claim 7, further comprising:
    a cladding layer positioned adjacent to the planar waveguide; and
    wherein the means for phase shifting includes a first portion of the cladding layer having a thickness different from a second portion of the cladding layer.

11. The apparatus of claim 7, wherein the means for phase shifting comprises:
    a first diffraction grating and a second diffraction grating, where the first diffraction grating and the second diffraction grating are offset in a longitudinal direction.

12. The apparatus of claim 1, further comprising:
    means for coupling a transverse magnetic polarized electromagnetic wave into the planar waveguide.

13. The apparatus of claim 12, wherein the means for coupling a transverse magnetic polarized electromagnetic wave into the planar waveguide comprises a diffraction grating.

14. An apparatus comprising:
    a pyramidal structure having four substantially flat sides converging to a point;
    a first material lying adjacent to an exterior of each of the sides and having a first index of refraction;
    a second material lying adjacent to an interior of each of the sides and having a second index of refraction; and
    a metallic pin positioned adjacent to the point.

15. The apparatus of claim 14, further comprising:
    means for phase shifting a portion of an electromagnetic wave in the structure.

16. An apparatus comprising:
    a conical structure having a first refractive index;
    a layer of material on a surface of the conical structure, the material having a second refractive index, lower than the first refractive index;
    a metal layer positioned on the layer of material; and
    a metallic pin positioned adjacent to a point of the conical structure.

17. A recording head comprising:
    a magnetic write pole;
    a planar waveguide positioned adjacent to the magnetic write pole, the planar waveguide being shaped to direct a linearly polarized electromagnetic wave to a focal point within the waveguide; and
    a metallic pin positioned at the focal point.

18. The recording head of claim 17, wherein the waveguide includes edges for reflecting the electromagnetic wave toward the focal point.

19. The apparatus of claim 18, wherein the edges have a substantially parabolic shape.

20. The apparatus of claim 19, wherein an end of the waveguide adjacent to the pin is truncated.

21. The apparatus of claim 17, wherein the planar waveguide forms a mode index lens.

22. The apparatus of claim 17, wherein the pin extends through an end of the planar waveguide.

23. The recording head of claim 17, further comprising means for phase shifting a portion of the linearly polarized electromagnetic wave.

24. The recording head of claim 23, wherein the means for phase shifting comprises:
    a layer of material having a first section with a first refractive index and a second section with a second refractive index.

25. The recording head of claim 23, wherein the planar waveguide includes a core layer and the means for phase shifting comprises:
    a first portion of the core layer having a thickness different from a thickness of a second portion of the core layer.

26. The recording head of claim 23, further comprising:
    a cladding layer positioned adjacent to the planar waveguide; and
    wherein the means for phase shifting includes a first portion of the cladding layer having a thickness different from a second portion of the cladding layer.

27. The recording head of claim 23, wherein the means for phase shifting comprises:
    a first diffraction grating and a second diffraction grating, where the first diffraction grating and the second diffraction grating are offset in a longitudinal direction.

28. The recording head of claim 17, further comprising:
    means for coupling a transverse magnetic polarized electromagnetic wave into the planar waveguide.

29. The recording head of claim 28, wherein the means for coupling a transverse magnetic polarized electromagnetic wave into the planar waveguide comprises a diffraction grating.

30. A recording head comprising:
    a magnetic write pole; and
    a waveguide positioned adjacent to the magnetic write pole, the waveguide including a pyramidal structure having four substantially flat sides converging to a point, a first material lying adjacent to an exterior of each of the sides and having a first index of refraction, a second material lying adjacent to an interior of each of the sides and having a second index of refraction, and a metallic pin positioned adjacent to the point.

31. The recording head of claim 30, further comprising:
    means for phase shifting a portion of an electromagnetic wave prior to reflection by the sides.

32. A recording head comprising:
    a magnetic write pole; and
    a waveguide positioned adjacent to the magnetic write pole, the waveguide including a conical structure having a first refractive index, a layer of material on a surface of the conical structure, the material having a second refractive index, lower than the first refractive index, a metal layer positioned on the layer of material, and a metallic pin positioned adjacent to a point of the conical structure.

33. A disc drive comprising:
    means for rotating a storage medium; and
    means for positioning a recording head adjacent to a surface of the storage medium;
    wherein the recording head comprises a magnetic write pole, a planar waveguide positioned adjacent to the magnetic write pole, the planar waveguide being shaped to direct a linearly polarized electromagnetic wave to a focal point within the waveguide, and a metallic pin positioned at the focal point.

* * * * *

UNITED STATES PATENT AND TRADEMARK OFFICE
CERTIFICATE OF CORRECTION

PATENT NO.     : 6,795,630 B2
DATED          : September 21, 2004
INVENTOR(S)    : William Albert Challener, Christophe Daniel Mihalcea and Tim Rausch It is certified that error appears in the above-identified patent and that said Letters Patent is hereby corrected as shown below:

Column 11,
Line 23, "300" should read -- ~300 --.

Column 13,
Line 51, "450" should read -- 45° --.

Line 55, " $n_{med} = n_{sil} \sin \theta_{max} = \sqrt{2} \bullet n_{sil}.$ " should read -- $n_{med} = n_{sil} \sin \theta_{max} = \sqrt{2} \bullet n_{sil}$ --.

Line 66, "piano-convex" should read -- plano-convex --.

Signed and Sealed this

Twenty-first Day of February, 2006

JON W. DUDAS
*Director of the United States Patent and Trademark Office*